Figures 1, 2, 3:
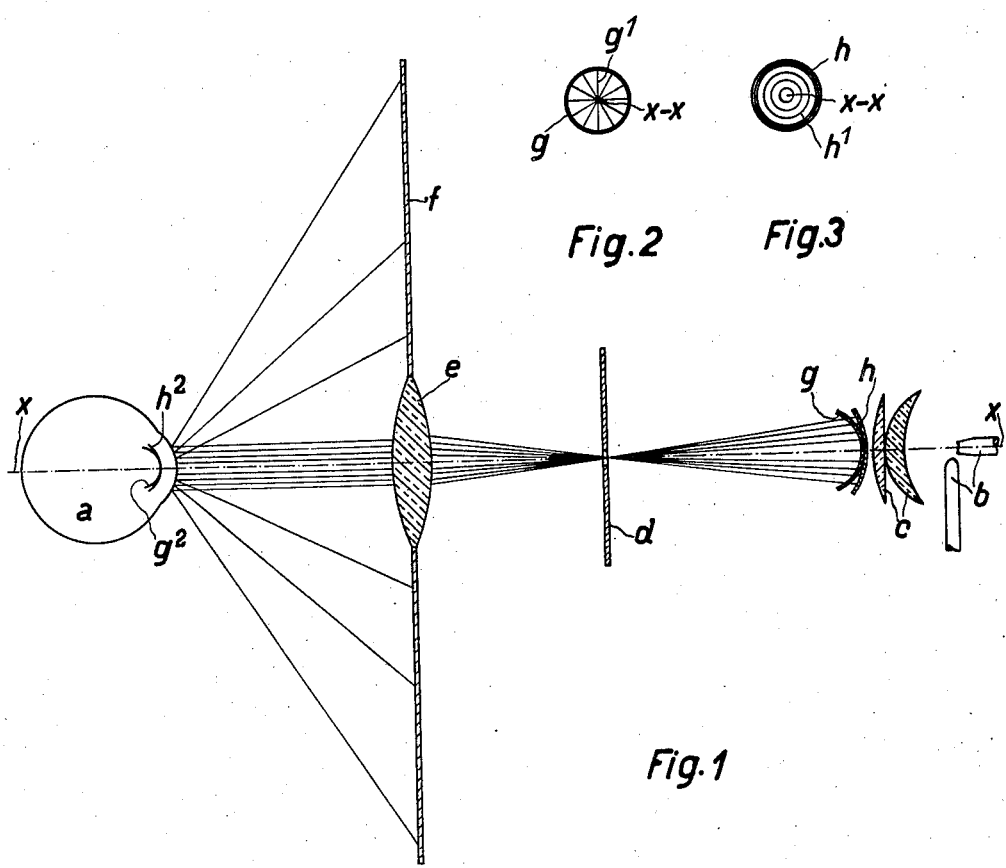

Oct. 8, 1935. H. HARTINGER 2,016,780
INSTRUMENT FOR EXAMINING CONVEXLY CURVED SURFACES
Filed March 1, 1933

Inventor:
Hans Hartinger

Patented Oct. 8, 1935

2,016,780

UNITED STATES PATENT OFFICE 2,016,780

INSTRUMENT FOR EXAMINING CONVEXLY CURVED SURFACES

Hans Hartinger, Jena, Germany, assignor to firm Carl Zeiss, Jena, Germany

Application March 1, 1933, Serial No. 659,160
In Germany March 3, 1932

4 Claims. (Cl. 88—20)

Application has been filed in Germany, March 3, 1932.

For ascertaining superficial alterations of the living cornea, an instrument has been used which comprises a device for intensely illuminating the cornea and a screen at right angles to the optical axis of the eye, this screen receiving the illumination rays reflected by the cornea. On this screen, which is substantially uniformly illuminated by the reflected light, irregularities in the formation of the surface of the cornea are represented by geometrical figures of a peculiar kind, and this without the cornea itself being imaged geometrically. These figures may be fixed by means of a photographic layer placed on the screen, it being possible in this manner to ascertain extremely fine superficial irregularities which, otherwise, may not be discerned even with a corneal microscope. However, as said before, the figures are not geometrically imaged, and it is for this reason that the said instrument is disadvantageous in that the irregularities in the surfaces cannot be located. All that can be done is to determine the locus of the irregularities approximately only by the kind and positions of the figures.

According to the invention this disadvantage is avoided by disposing in the ray path of the illumination device a net of coordinates and by imaging this net on the projection screen by means of the illumination device and the surface to be examined. In this way the irregularities may not merely be discerned but accurately located, since the image of the net is very exact. By constructing it in this manner, the instrument also permits to be used for the examination of convexly curved surfaces other than that of the cornea of the eye, for instance, for the examination of the surfaces of lenses, balls and the like. The net of coordinates, whether it be a net of rectangular or polar coordinates, may be disposed, for instance, on a plane plate to be positioned in the rear of a condenser converging the rays. On account of the imaging pencils being astigmatically distorted on the curved surface to be examined, the said latter construction, however, would provide faulty images only.

To avoid this drawback, it is advisable to use a net of polar coordinates consisting of straight radial lines and of circles concentric to the pole and to provide the straight radial lines on one, and the concentric circles on another curved surface, as a consequence of which all parts of the net are exactly imaged on the projection surface. The curvatures of the surfaces bearing the coordinates are due to the following consideration. Assuming a system of polar coordinates provided on the screen being reflected and virtually imaged on the surface to be examined, the astigmatism which arises on account of oblique reflexion will cause two astigmatic image shells. On the sagittal and the tangential image shell are sharply imaged the radial lines of the system of polar coordinates and the concentric circles, respectively. Consequently, when an image of a system of coordinates is to be produced on the projection screen in the opposite sense, by way of the surface to be examined, the system is to be so disposed that the pencil of imaging rays (virtually) images the concentric circles and the radial lines in the said tangential and sagittal image shells, respectively.

Placing the system of polar coordinates on two separate surfaces may be avoided by so constructing that part of the illumination device which serves for imaging the net of coordinates that this part compensates at least in a certain zone for the astigmatism of reflexion of the surface to be examined. The remaining astigmatic curvature of the image, however, may still render it expedient to dispose the net of coordinates on a definite curved surface, which it is convenient to replace by a spherical surface approximating as closely as possible.

To image the net of coordinates on the projection surface on a definite scale which is determined once for all, that part of the illumination device which is to image the net is to be so constructed as to provide a telecentric ray path.

Figure 1 of the accompanying drawing represents schematically the ray path in a constructional example of an instrument according to the invention. Figures 2 and 3 represent in views single parts of the instrument assumed to be used for producing the ray path according to Figure 1.

Suppose that the surface of the cornea of an eye $a$ is to be examined. This eye is illuminated by means of an optical system consisting of a source of light, which is an arc-lamp $b$, a condenser $c$, a diaphragm $d$, and a converging lens $e$. The condenser $c$ projects an image of the positive crater of the arc-lamp $b$ into the aperture of the diaphragm $d$ disposed at the focus of the lens $e$ and, as a consequence, a pencil of parallel light rays emanates from the lens $e$ and strikes the cornea to be examined. The cornea reflects the pencil to a circular screen $f$ surrounding the lens $e$. Between the condenser $c$ and the diaphragm $d$ are disposed two glass shells $g$ and $h$ whose refraction is equal to zero and which touch each other in the optical axis X—X. The shell designated $g$ has straight radial lines $g^1$ (Figure 2) and the shell designated $h$ circles $h^1$ concentric to the optical axis (Figure 3). If used alone, the lens $e$ would image the straight lines and the circles in two real image shells $g^2$ and $h^2$. However, when the eye $a$ to be examined is at the place represented in the drawing, the lens $e$ and the cornea of the eye $a$ project on the screen $f$ real images of the shells $g$ and $h$ and of the straight lines $g^1$ and the circles $h^1$ on these shells, the combined images of these straight lines and the circles representing a net of polar coordinates. The glass shells $g$ and $h$ are so curved that the image shells $g^2$ and $h^2$ represent the sagittal and the tangential virtual image shells, respectively, in which, in the reverse ray path, considering the corneal astigmatism, the radial straight lines and the concentric circles of a corresponding system of polar coordinates of the screen $f$, respectively, would be imaged.

The two parts of the system of polar coordinates may be imaged in the astigmatic image shells of the cornea on any scale. The concentric circles $h^1$ may be given such diameters that the reflexion on the cornea is effected at definite known distances from the optical axis or from the vertex of the cornea, for instance at distances of 0.5 mm., 1.0 mm., 1.5 mm., etc. There being a telecentric ray path, these distances of the reflected rays remain constant even if the distance of the cornea from the illumination lens $e$ should slightly alter on account of the different conditions of curvature of the cornea.

As mentioned already, the lens $e$, or a lens system used instead of this single lens, may be so constructed that, in the reverse ray path, the virtual astigmatic image shells $g^2$ and $h^2$ of the cornea are imaged in one single image shell, and this image shell may be replaced approximately by a spherical bowl. In certain circumstances, that lens surface of the condenser $c$ which faces the diaphragm $d$ may be so constructed as to bear the system of coordinates.

The diaphragm $d$ may be constructed as an iris diaphragm, that is to say as a diaphragm of changeable diameter. To facilitate photographing the image on the screen, a removable red filter and an instantaneous shutter may be disposed at the locus of the diaphragm $d$.

I claim:

1. An instrument for finding irregularities in convexly curved surfaces by means of reflected light, comprising an optical system illuminating by means of a light pencil the surface to be examined, a projection screen normal to the direction in which the said pencil strikes the surface to be examined and receiving the illumination rays reflected by this surface, and a net of coordinates provided on surfaces in the illuminating system, at least part of this system and the surface to be examined being adapted to image the net of coordinates on the projection screen.

2. An instrument for finding irregularities in convexly curved surfaces by means of reflected light, comprising an optical system illuminating by means of a pencil of light the surface to be examined, a projection screen normal to the direction in which the said pencil strikes the said surface and receiving the illumination rays reflected by this surface, and two curved transparent shells lying in the ray path of the said optical system and touching each other in the axis of this optical system, the one of these shells bearing straight radial lines, and the other of these shells bearing circles concentric to the point of intersection of the said straight lines, the two shells being so positioned that the surface to be examined and that part of the optical system which lies between the shells and this surface are adapted to produce on the projection screen an image of the shells.

3. An instrument for finding irregularities in convexly curved surfaces by means of reflected light, having an optical system illuminating by means of a pencil of light the surface to be examined and consisting of a plurality of converging members, a projection screen normal to the direction in which the said pencil strikes the said surface and receiving the illumination rays reflected by the surface to be examined, a net of coordinates lying in the ray path of the said optical system and being so positioned that the surface to be examined and that part of the optical system which lies between the net of coordinates and this surface are adapted to produce on the projection screen the net of coordinates, and a diaphragm disposed in the optical system, the focus of all the converging members between the said diaphragm and the said projection screen lying in this diaphragm.

4. An instrument for finding irregularities in convexly curved surfaces by means of reflected light, comprising an optical system illuminating by means of a light pencil the surface to be examined, a projection screen normal to the direction in which the said pencil strikes the surface to be examined and receiving the illumination rays reflected by this surface, and a net of coordinates provided on surfaces in the illuminating system, at least part of this system and the surface to be examined being adapted to image the net of coordinates on the projection screen, the surfaces on which the said coordinates are provided being so curved as to neutralize the astigmatic deformation the surface to be examined produces on the imaging ray pencil.

HANS HARTINGER.